T. H. ELLIOTT.
FRUIT SEEDER.
APPLICATION FILED FEB. 24, 1908.
934,963.
Patented Sept. 21, 1909.
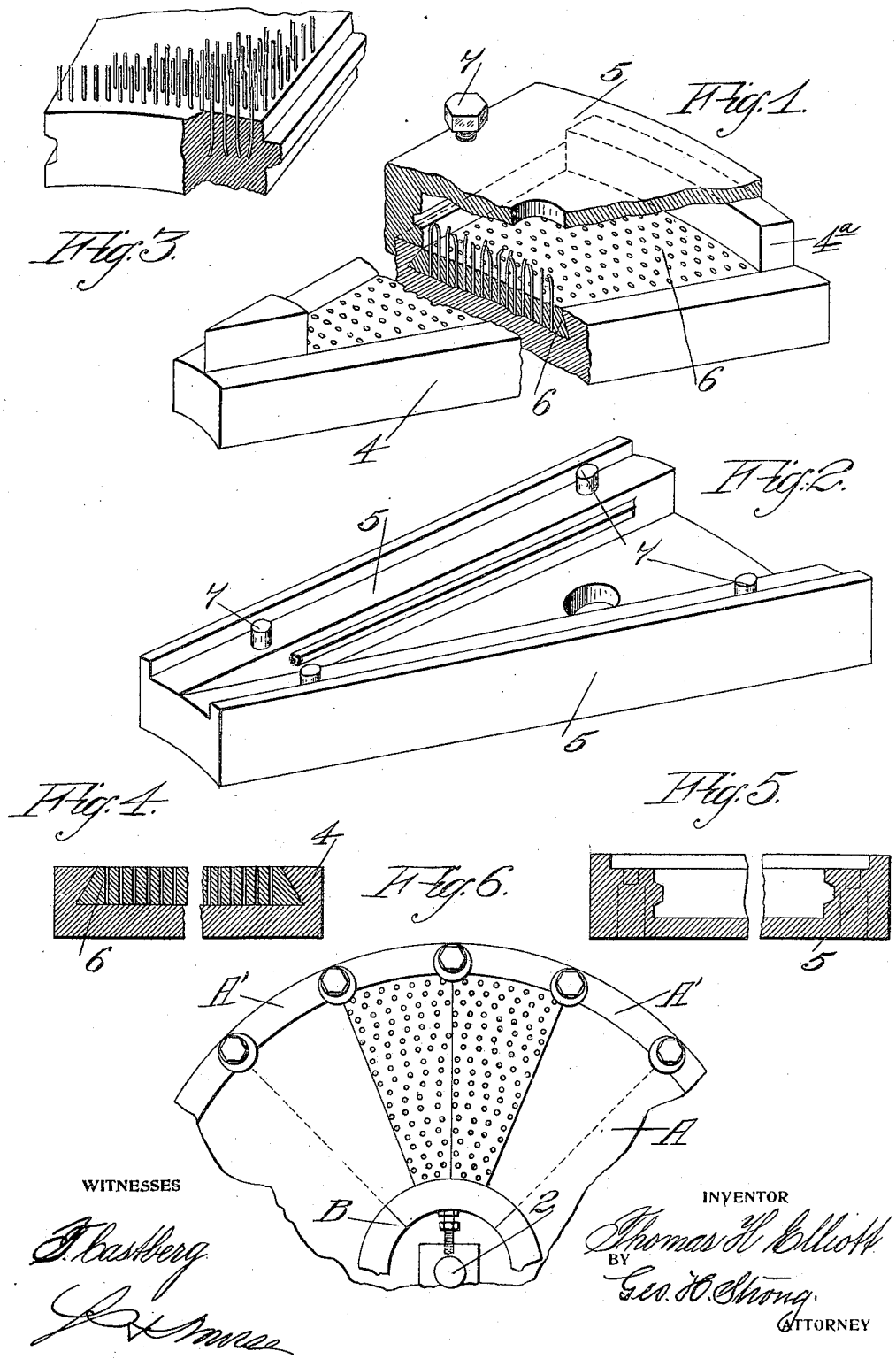

UNITED STATES PATENT OFFICE.

THOMAS H. ELLIOTT, OF SELMA, CALIFORNIA, ASSIGNOR TO SELMA FRUIT COMPANY, INC., OF SELMA, CALIFORNIA.

FRUIT-SEEDER.

934,963.  Specification of Letters Patent.  Patented Sept. 21, 1909.

Application filed February 24, 1908. Serial No. 417,532.

*To all whom it may concern:*

Be it known that I, THOMAS H. ELLIOTT, a citizen of the United States, residing at Selma, in the county of Fresno and State of California, have invented new and useful Improvements in Fruit-Seeders, of which the following is a specification.

My invention relates to an apparatus, and means especially designed for removing the seeds from raisins and like fruit, and separating the seeds from the fruit.

It consists in the combination of mechanism, and in details of construction which will be more fully explained by reference to the accompanying drawings, in which—

Figure 1 is a perspective view, broken away, showing the mold parts assembled. Fig. 2 is a perspective view of the cover part of the mold. Fig. 3 is a perspective view, broken away, showing a segment when cast. Fig. 4 is a cross section of the lower part of the mold. Fig. 5 is a similar section of the upper part of the mold. Fig. 6 is a front elevation of two segments and their carrying disk.

My present invention is especially applicable to the means for forming the toothed members, of which the seeding device is composed, and in mounting said members to form an adjustable and continuous means for separating the seeds from the fruit.

In carrying out my invention I employ a disk A which is here shown with a flange A' projecting parallel with the axis around the periphery, and centrally adjusting segments B between which and the outer flange, the toothed segments are adjustably secured as will be hereafter described.

In the construction of the toothed portion of my device I have found it preferable to form this part in segments which are interlocked with each other, and upon the face of the disk so as to form a continuous adjustable disk, with the pins projecting from its face. In order to construct these segments, I have shown a mold consisting of sections 4 and 5. The lower section is dove-tailed or otherwise so constructed as to receive a plate 6 which is preferably made of brass, and in the form of the segments of which the toothed face of the apparatus is composed. In the present structure I have illustrated the machine as employing sixteen of these segments. The plate 6 may be beveled on each of its divergent sides so as to interlock with the bevel of the sides of the mold 4. This plate may be approximately ⅜ of an inch thick, and is bored full of holes, passing entirely through the plate and disposed on lines of true circles. I prefer to make these circles a distance apart of #17 English standard gage steel wire, and the holes in each circle are spaced the same. This plate is fitted into the part 4 of the mold by removing the outer or rear end 4ª and the plate may then be slipped into place where it will be locked by the dove-tails and held firmly. I then take #17 English standard gage plow steel wire cut into lengths of substantially ⅞ of an inch, and having ends slightly bent and creased. The smooth ends of these wires are dropped into the holes of the brass plate and when all the holes are filled a fine powder is sifted over the faces of the mold, and by jarring the mold, the powder will sift into the holes around the pins. I have found that lycopodium, in fine powder, produces the best results as not being injuriously affected by the heat which is subsequently applied.

The upper part of the mold 5 is grooved on one side, and has a corresponding tongue upon the other. This portion of the mold slips over the top of the part 4, and has a pour hole in the center through which molten metal may be introduced. Upon the sides of this portion of the mold are screws 7 threaded through the edge of the mold, and resting on the bottom portion 4. The metal which we have found very satisfactory for the purpose is Babbitt or type metal. This molten metal is poured into the upper part of the mold, and fills the space above the plate 6 and around the upwardly projecting ends of the pins, which by reason of their roughening, bending, or creasing, will be firmly locked in the metal.

After the mold has set for a sufficient time, it may be chilled, and by then turning the screws 7, they will act against the lower portion of the mold to force the top up from the bottom, and the teeth being held firmly in the molten metal, will be withdrawn from the holding plate 6, by this movement, the plate 6 being interlocked as previously described, with the lower portion of the mold. When the upper portion of the mold is thus withdrawn, the cast segment with its teeth may be removed by sliding out of the larger end of the upper portion of the mold, and it will have formed upon it a groove upon one side, and a corresponding channel upon the other, formed by the corresponding groove and channel in the upper part of the mold. These segments are fixed upon the disk A, uniting to form a complete disk with annular rows of pins, with intermediate grooves or channels to receive the fruit pulp, while the seeds are arrested or impaled upon the points of the teeth.

Having thus described my invention, what I claim and desire to secure by Letters Patent is—

1. A means for forming segmental pin plates and interlocking assembling devices, said means including a segmental mold base member, a removable flat segment having holes made therethrough in concentric curves, and adapted to hold pins in vertical position, means for locking said perforated segment in the mold base, a cap member chambered to receive molten metal around the upwardly projecting ends of the pins, said mold members having a groove and a corresponding channel upon opposite radial edges.

2. In a mold of the character described, a base member having divergent walls, and circularly curved outer and inner ends, a flat segment having rows of holes concentric with the outer and inner peripheries of the base member to receive pins, means by which said segment is locked in the mold, a cap member having a chamber for molten metal, and into which chamber the free ends of the pins project, said mold having a radial groove and a corresponding rib on opposite interior radial edges.

3. In a mold of the character described, a base member having divergent upturned walls, with grooves in their interior faces, a removable plate, with edges fitted to interlock with the grooves, and having concentrically curved ends, and vertical holes disposed concentrically from the inner to the outer end to receive independent pins, a cap member fitting the base member, said base chambered to receive molten metal and embed the free end of the pins therein, and having a groove and a corresponding rib to form interlocking tongues and grooves on the edges of the cast.

4. A mold for forming cast sectors, with pins projecting therefrom transverse to the plane of the sector, said mold comprising a substantially V-shaped element, a plate fitting within and corresponding to said first named element, the latter having radial slots projecting above the plate, said plate having holes to receive the pins, and a cover member inclosing with the radial walls of said first named element and said pin-holding plate, a casting chamber.

In testimony whereof I have hereunto set my hand in presence of two subscribing witnesses.

THOMAS H. ELLIOTT.

Witnesses:
   NELLIE M. WENTY,
   J. E. MOORE.